United States Patent [19]

Gjertsen et al.

[11] Patent Number: 4,762,676
[45] Date of Patent: Aug. 9, 1988

[54] TOP NOZZLE ADAPTER PLATE WITH FUEL ROD CAPTURE GRID HAVING PRESSURE DROP ADJUSTING MEANS

[75] Inventors: Robert K. Gjertsen, Monroeville Boro; John F. Wilson, Murrysville, both of Pa.; William E. Kirby, Columbia, S.C.

[73] Assignee: Westinghouse Electric Corp., Pittsburgh, Pa.

[21] Appl. No.: 752,272

[22] Filed: Jul. 5, 1985

[51] Int. Cl.[4] .............................................. G21C 3/32
[52] U.S. Cl. ..................................... 376/443; 376/439; 376/449
[58] Field of Search ................ 376/443, 439, 446, 449

[56] References Cited

U.S. PATENT DOCUMENTS

| 4,032,398 | 6/1977 | Cross et al. | |
|---|---|---|---|
| 4,427,624 | 1/1984 | Marlatt et al. | 376/446 X |
| 4,448,745 | 5/1984 | Anthony | 376/448 |
| 4,505,877 | 3/1985 | Rion | 376/352 |
| 4,618,472 | 10/1986 | Gjertsen et al. | 376/443 X |

FOREIGN PATENT DOCUMENTS 611151 10/1960 Italy ................................... 376/443

*Primary Examiner*—John F. Terapane
*Assistant Examiner*—John S. Maples

[57] ABSTRACT

A top nozzle adapter plate for use in a fuel assembly of a nuclear reactor includes an upper structural component and a lower functional component supported from the upper component. The fuel assembly has elongated structural members and fuel rods disposed in a predetermined array. The upper structural component of the adapter plate includes spaced and interconnected hubs and ligaments arranged to define substantial open areas for coolant flow therethrough while providing a rigid framework capable of transmitting lifting loads imposed by the fuel assembly. The hubs are connected to the elongated structural members of the fuel assembly. The lower functional component of the adapter plate includes a grid composed of a plurality of spaced and interleaved straps which cross one another to form intersections aligned with individual fuel rods in the array thereof for restraining movement of fuel rods upward from the fuel assembly while defining open channels through the grid for allowing passage of coolant flow therethrough. The grid also contains void areas through which extend the hubs of the upper component. The lower component also includes coolant flow directing means being operable to establish a predetermined desired pressure drop across the top nozzle of the fuel assembly. In one form, the coolant flow directing means is a plurality of tabs connected to the grid straps and extending outwardly therefrom. The tabs are adjustable into various desired positional relationships with respect to the grid channels for controlling coolant flow therethrough. In a modified form, the coolant flow directing means is in the form of a thin flat plate having holes of predetermined desired sizes and shapes formed therein. The plate extends along the interleaved straps of the grid with its holes generally aligned with the open channels of the grid.

18 Claims, 5 Drawing Sheets

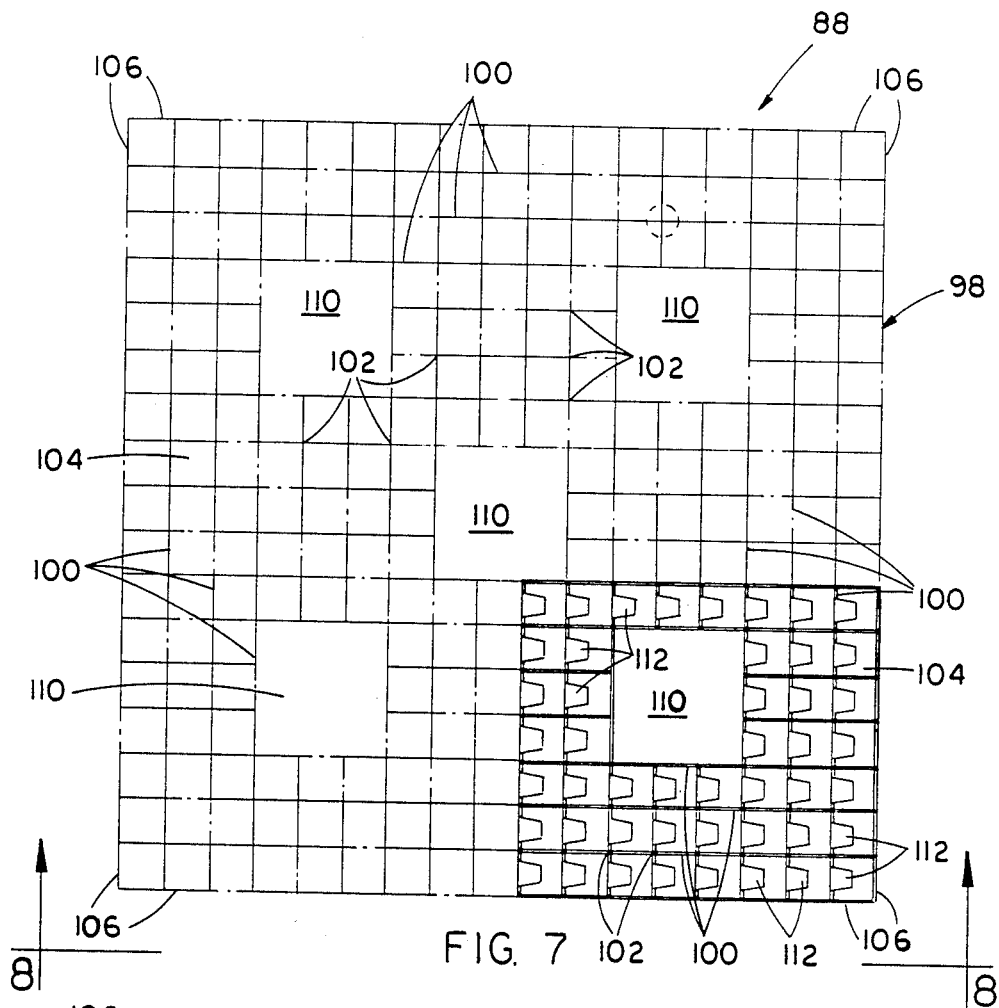
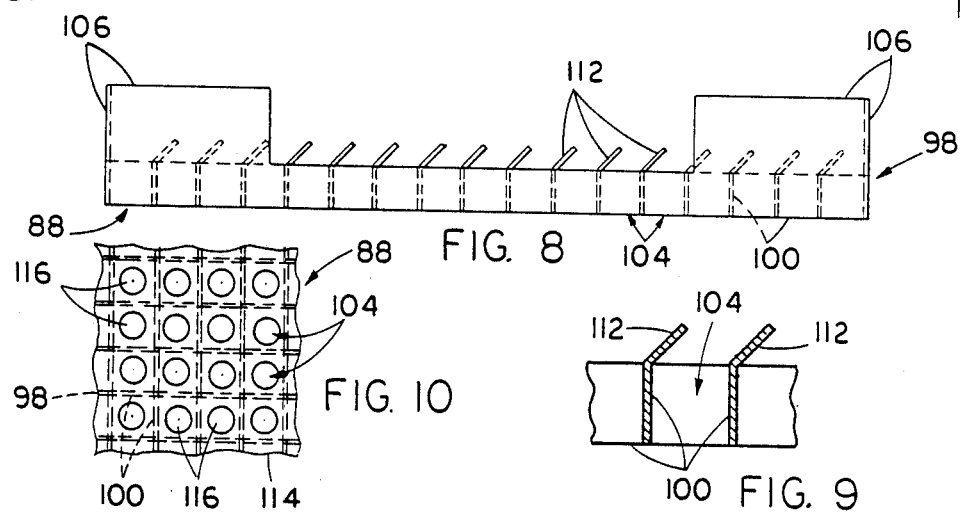
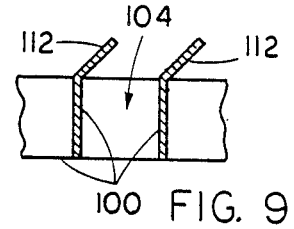

TOP NOZZLE ADAPTER PLATE WITH FUEL ROD CAPTURE GRID HAVING PRESSURE DROP ADJUSTING MEANS

CROSS REFERENCE TO RELATED APPLICATION

Reference is hereby made to the following copending application dealing with related subject matter and assigned to the assignee of the present invention: "Integral Reusable Locking Arrangement For A Removable Top Nozzle Subassembly Of A Reconstitutable Nuclear Fuel Assembly" by Robert K. Gjertsen et al, assigned U.S. Ser. No. 857,675 and filed Apr. 30, 1985.

BACKGROUND OF THE INVENTION

1. Field of the Invention

The present invention relates generally to fuel assemblies for nuclear reactors and, more particularly, is concerned with an adapter plate of a fuel assembly top nozzle which has a fuel rod capture grid with an adjustable flow feature for tailoring the top nozzle pressure drop to the specific reactor core location of the fuel assembly.

2. Description of the Prior Art

In most nuclear reactors, the reactor core is comprised of a large number of elongated fuel assemblies. Conventional designs of these fuel assemblies include a multiplicity of fuel rods held in an organized array by grids spaced along the fuel assembly length. The grids are attached to a plurality of control rod guide thimbles. Top and bottom nozzles on opposite ends of the fuel assembly are secured to the guide thimbles which extend above and below the opposite ends of the fuel rods. At the top end of the fuel assembly, the guide thimbles are attached in openings provided in the lower adapter plate of the top nozzle.

It is conventional practice to design the adapter plate of the fuel assembly top nozzle to accommodate three requirements. First, the adapter plate must satisfy a structural criteria, that is, it must be capable of lifting the fuel assembly under a 6 g load. Second, it must serve a fuel rod capture function in which the fuel rods are mechanically restrained by the adapter plate from ejections upwardly from the core. Third, from a functional standpoint, the adapter plate must have sufficient open area to permit reactor coolant flow to pass through the top nozzle with minimum pressure drop.

U.S. Pat. No. 4,427,624 proposes a composite nozzle for a fuel assembly adapted for installation on the upper or lower end thereof which is constructed from two components. The first component of the nozzle is a casting weldment or forging designed to carry handling loads, support fuel assembly weight and flow loads, and interface with structural members of both the fuel assembly and reactor. In short, the first component is designed to satisfy the structural criteria.

The second component of the nozzle is a thin stamped bore machine flow plate adapted for removable attachment to the first component. The plate is designed to limit upward movement of the fuel rods and thus ejection thereof from the core. The plate also has multiple openings or orifices of varying size and configuration to help direct coolant flow in a predetermined path through the fuel assembly and to assure that a pressure drop of predetermined magnitude will take place across the assembly. In short, the second component is intended to fulfill the two requirements of rod capture and coolant flow with minimum pressure drop.

Notwithstanding the overall acceptability of the above-described basic approach to end nozzle construction, the second flow plate component proposed in the aforesaid patent has been found incapable of achieving both functions. In order to provide sufficient coolant flow through it to attain the minimum pressure drop desired, the plate must be built with insufficient structure to perform the fuel rod capture function. Consequently, a need remains for an alternative design of a component which will satisfy the dual requirements of minimum pressure drop and fuel rod capture.

SUMMARY OF THE INVENTION

The present invention provides a top nozzle adapter plate construction designed to satisfy the aforementioned needs. The present invention provides an adapter plate which has separate components for carrying out the structural and functional features of the adapter plate. The functional requirements of fuel rod capture and coolant flow with low pressure drop are carried out by a grid of interleaved straps which form a large number of coolant flow channels and a large number of intersections for restraining fuel rod movement, and by means for adjusting the pressure drop to tailor it to the specific distribution desired across the fuel assembly. The pressure drop through the grid can be changed without affecting the structural design and integrity of the adapter plate which is established by another component thereof with which the grid is connected.

The top nozzle adapter plate of the present invention is really important in reload operations for matching coolant flow output of different fuel assemblies. In each reload operation, approximately one-third of the fuel assemblies are changed. Thus, the reactor will ordinarily contain different fuel assemblies with different amounts of spent fuel. With the ability of changing the direction of flow through the top nozzle and thereby the pressure drop, one can match the outputs of two different fuel assemblies which are located adjacent to one another.

Accordingly, the present invention is directed to a top nozzle adapter plate for use in a fuel assembly of a nuclear reactor. The fuel assembly has a plurality of elongated structural members and a multiplicity of fuel rods disposed in a predetermined array. The fuel rods are supported in a manner which permits the possibility of upward movement thereof from the fuel assembly when acted upon by hydraulic forces occurring in upward coolant flow through the fuel assembly in the reactor. The adapter plate comprises: (a) an upper structural component capable of rigid connection to the elongated structural members; and (b) a lower functional component connected to the upper structural component. The lower component includes a grid composed of a plurality of spaced and interleaved straps which are capable of restraining upward movement of the fuel rods from the fuel assembly while defining open channels through the grid which are capable of allowing passage of coolant flow therethrough. The lower component also includes coolant flow directing means being operable to establish a predetermined desired pressure drop across the top nozzle of the fuel assembly.

More particularly, the interleaved straps of the grid cross one another to form intersections capable of alignment with individual fuel rods in the array thereof. Further, the coolant flow directing means can take either of two embodiments. First, it can be in the form of a plurality of tabs connected to predetermined ones of the grid straps and extending outwardly therefrom, with the tabs being adjustable into various desired positional relationships with respect to the grid channels for controlling coolant flow therethrough. Or, the coolant flow directing means can be in the form of a thin flat plate having holes of predetermined desired sizes and shapes formed therein, with the plate extending along the interleaved straps of the grid and its holes generally aligned with the open flow channels of the grid.

Additionally, the upper structural component includes a plurality of spaced and interconnected hubs and ligaments arranged to define substantial open areas for coolant flow therethrough while providing a rigid framework capable of transmitting lifting loads imposed by the fuel assembly. The hubs are capable of connection to the elongated structural members of the fuel assembly. Also, the grid includes void areas through which the hubs of the upper component extend when the grid is connected to the upper component. Finally, the upper component includes a plurality of open flanges connected to and extending outwardly of the hubs, whereas the grid includes upstanding corner strips for attachment to the flanges of the upper component.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 7 is an enlarged top plan view of the fuel rod capture grid of the top nozzle of FIG. 2, showing the grid disassembled from the remainder of the adapter plate of the top nozzle.

FIG. 8 is a side elevational view of the fuel rod capture grid as seen along line 8—8 of FIG. 7.

FIG. 9 is an enlarged fragmentary view, partly in section, of the grid of FIG. 8, showing several of the directional flow tabs.

FIG. 10 is a fragmentary top plan view of a modified embodiment of the fuel rod capture grid.

DETAILED DESCRIPTION OF THE INVENTION

Figure 1:
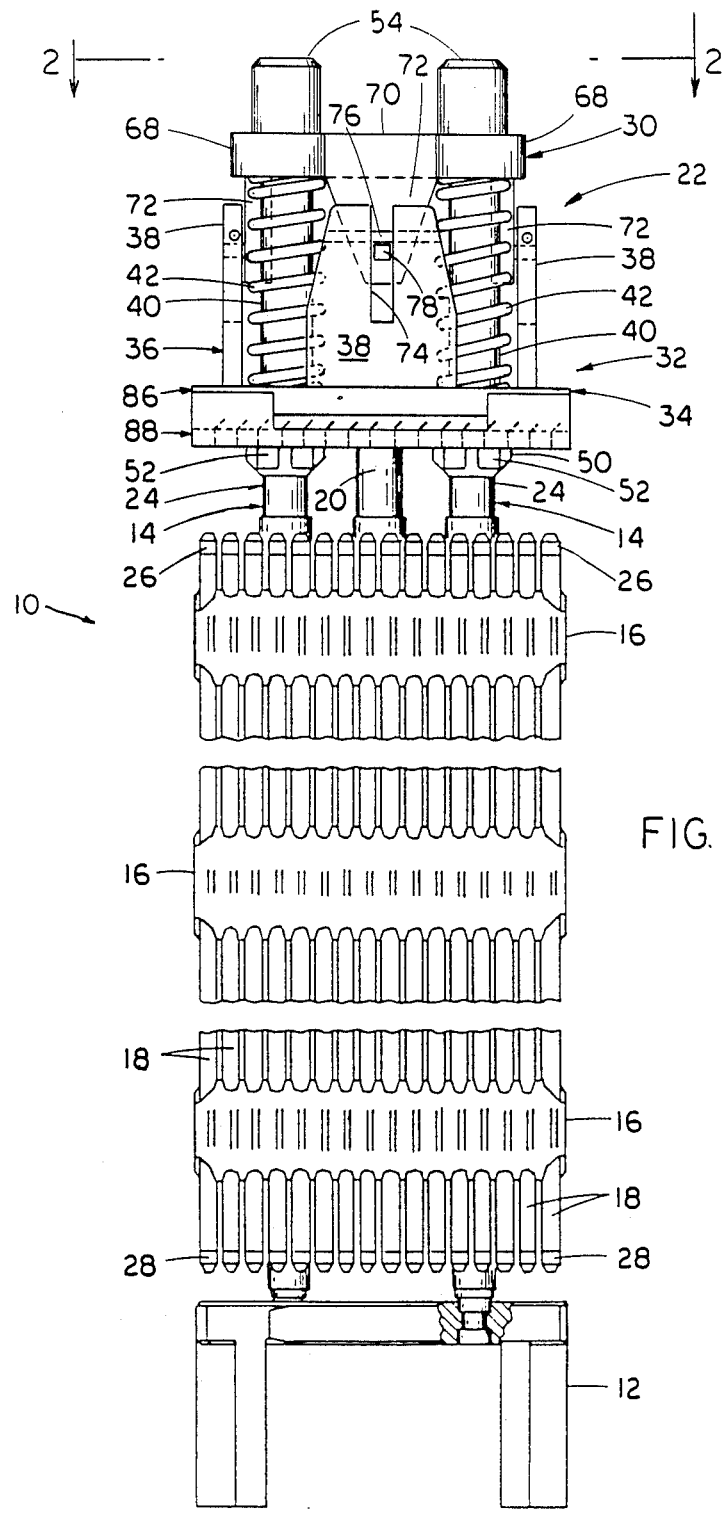
FIG. 1 is a side elevational view, with parts partially sectioned and broken away for purposes of clarity, of a reconstitutable fuel assembly having a top nozzle adapter plate constructed in accordance with the principles of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a reconstitutable nuclear fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper end portions 24 of the guide thimbles 14 to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets (not shown) and is closed at its opposite ends by upper and lower end plugs 26,28 to hermetically seal the rod. The fuel pellets composed of fissile material are responsible for creating the reactive power of the nuclear reactor. A liquid moderator-coolant such as water, or water containing boron, is pumped upwardly through the guide thimbles 14 and along the fuel rods 18 of the fuel assembly 10 in order to extract heat generated therein for the production of useful work.

To control the fission process, a number of control rods (not shown) are reciprocally movable in the guide thimbles 14 located at predetermined positions in the fuel assembly 10. Since the control rods are inserted into the guide thimbles 14 from the top of the fuel assembly 10, the placement of the components forming the top nozzle 22 and their attachment to the upper end portions 24 of the guide thimbles 14 must accommodate the movement of the control rods into the guide thimbles from above the top nozzle 22.

Top Nozzle Removably Mounted on Guide Thimbles

Figure 2:
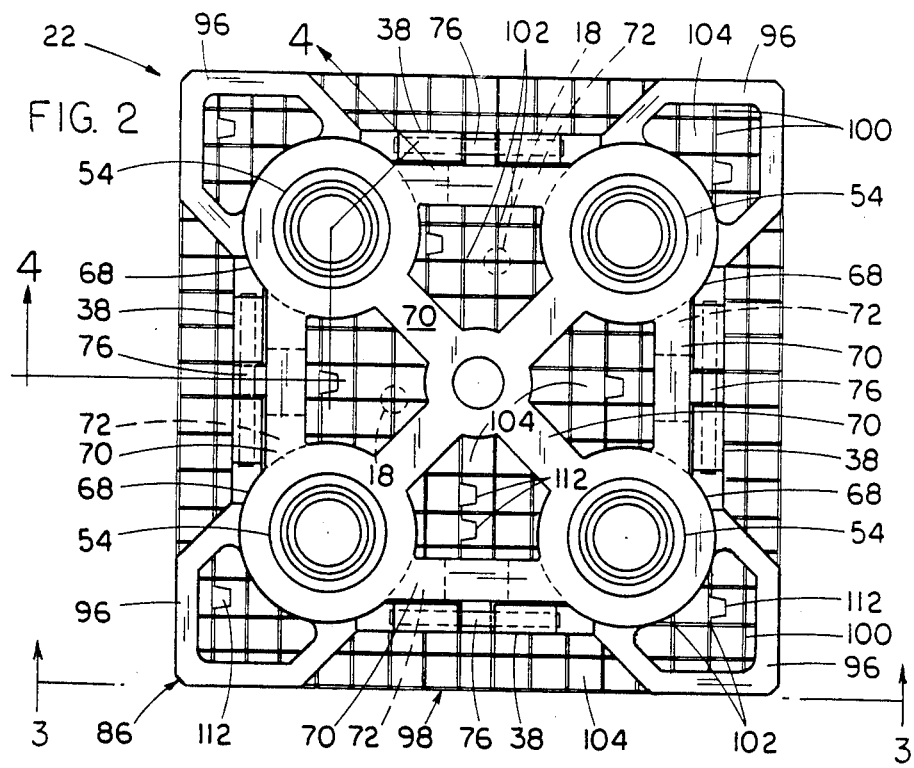
FIG. 2 is an enlarged top plan view of the fuel assembly as seen along line 2—2 of FIG. 1, showing the preferred adapter plate of the present invention and a few of the fuel rods of the assembly in dotted outline form being located under the fuel rod capture grid of the adapter plate.
Figure 3:
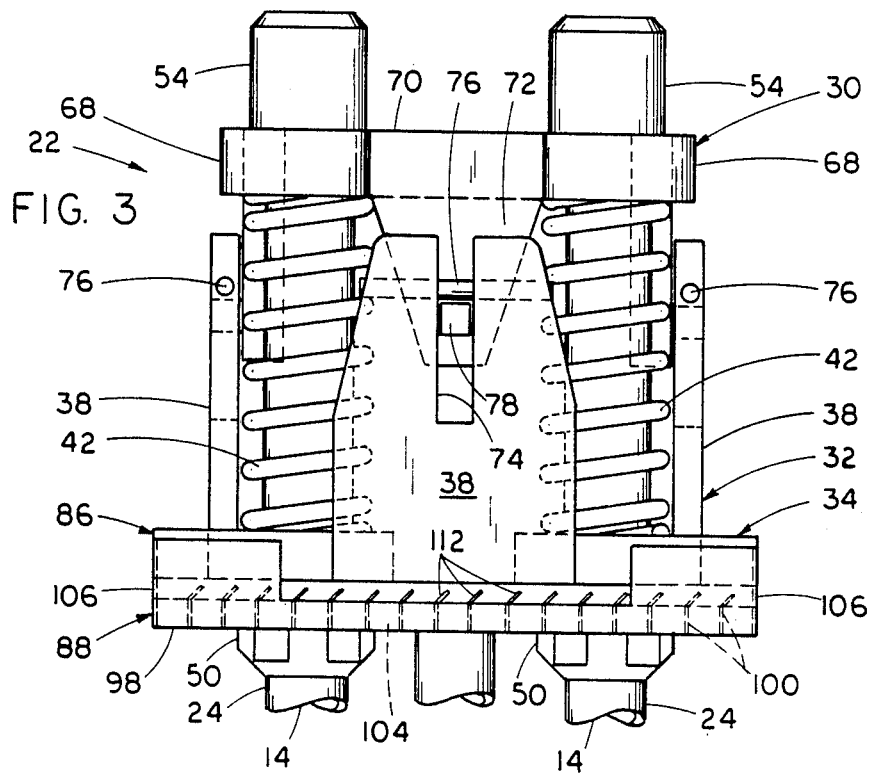
FIG. 3 is an elevational view of the top nozzle as seen along line 3—3 of FIG. 2.

Turning now to FIGS. 2 and 3, as well as FIG. 1, there is shown in greater detail the separate components making up the top nozzle 22 which is removably mounted on the upper end portions 24 of the guide thimbles 14 of the fuel assembly 10. The top nozzle 22 basically includes an upper hold-down plate 30, an enclosure 32 composed of a lower adapter plate 34, having a construction in accordance with the present invention to be described below, and an upstanding discontinuous sidewall 36 formed by a plurality of spaced upstanding wall portions 38 surrounding and attached to the periphery of the adapter plate, a plurality of tubular alignment sleeves 40 disposed between the upper and lower plates 30,34, and a plurality of hold-down coil springs 42 extending between the upper and lower plates 30,34 and about the respective sleeves 40. The upper hold-down plate 30 has a plurality of passageways 44 defined therethrough, while the lower adapter plate 34 has a plurality of openings 46, the passageways 44 and openings 46 being arranged in respective patterns which are matched to that of the guide thimbles 14 of the fuel assembly 10.

More particularly, the upper end portions 24 of the guide thimbles 14 extend upwardly through the openings 46 in the lower adapter plate 34 and above the upper surface 48 thereof. A plurality of lower retainers 50 are attached, such as by brazing, to the guide thimbles 14 below the adapter plate 34 for limiting downward slidable movement of the adapter plate 34 relative to the guide thimbles 14 and thereby supporting the adapter plate on the guide thimbles with the upper end portions 24 thereof extending above the adapter plate. Each lower retainer 50 on one guide thimble 14 has a series of scallops 52 formed on its periphery which are aligned with those of the fuel rods 18 grouped about the respective one guide thimble so that the fuel rods may be removed and replaced during reconstitution of the fuel assembly 10.

Figure 5:
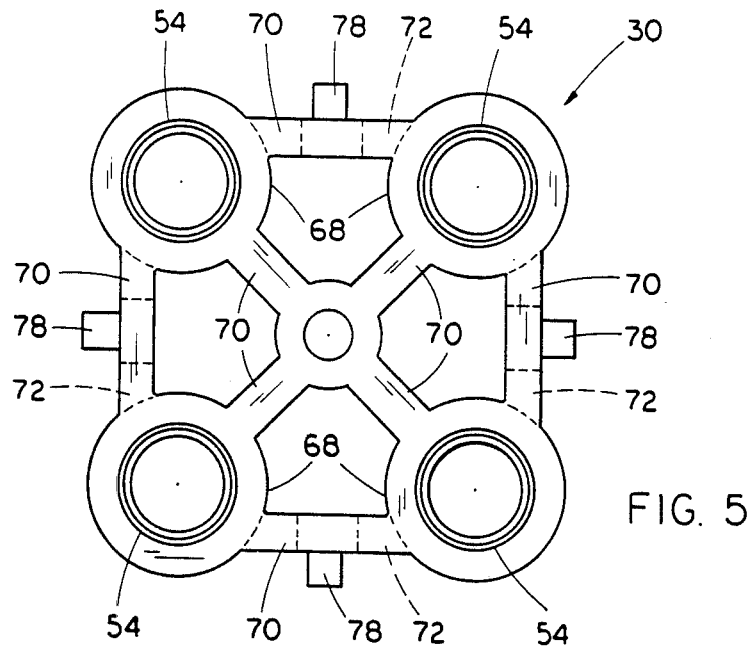
FIG. 5 is a top plan view of the upper hold-down plate of the top nozzle of FIG. 2, showing the hold-down plate disassembled from the top nozzle.

Furthermore, the top nozzle 22 includes a plurality of upstanding bosses 54 having respective central bores 56 defined therethrough. The bosses 54 are disposed above the upper hold-down plate 30, and each boss is attached to the hold-down plate 30 such that its central bore 56 is aligned with a respective one of the passageways 44 of the hold-down plate. Additionally, each boss 54 is of a cross-sectional size adapted to interfit within one of a plurality of holes 58 (only one of which is seen in FIG. 5) formed in the upper core plate 60 which opens at a lower side 62 of the core plate. The upper circumferential edge 64 of each boss 54 is chamfered for mating with a complementarily chamfered edge 66 on the lower side 62 of the upper core plate 60 at the entrance to each of the holes 58 defined therein. Edges having such shapes act as guiding surfaces which facilitate alignment and insertion of the respective bosses 54 into the corresponding holes 58 in the upper core plate 60 during installation of the fuel assembly 10 within the reactor core.

As mentioned above, the hold-down coil springs 42 are disposed about the respective elongated alignment sleeves 40 within the enclosure 32. Further, the springs 42 extend between the lower adapter plate 34 and the upper hold-down plate 30 and support the upper plate in a spaced relation above the lower plate at a stationary position in which the upper plate abuts the lower side 62 of the upper core plate 60 with the upstanding bosses 54 interfitted within the holes 58 of the upper core plate 60. Also, as seen in FIG. 5, the upper hold-down plate 30 is composed of an array of hubs 68 and ligaments 70 which extend between and interconnect the hubs. Each of the hubs 68 has one of the passageways 44 defined therethrough. Furthermore, one boss 54 is disposed above and connected to each of the hubs 68 with the bore 56 of the boss aligned with the respective passageway 44 of the hub.

Figure 4:
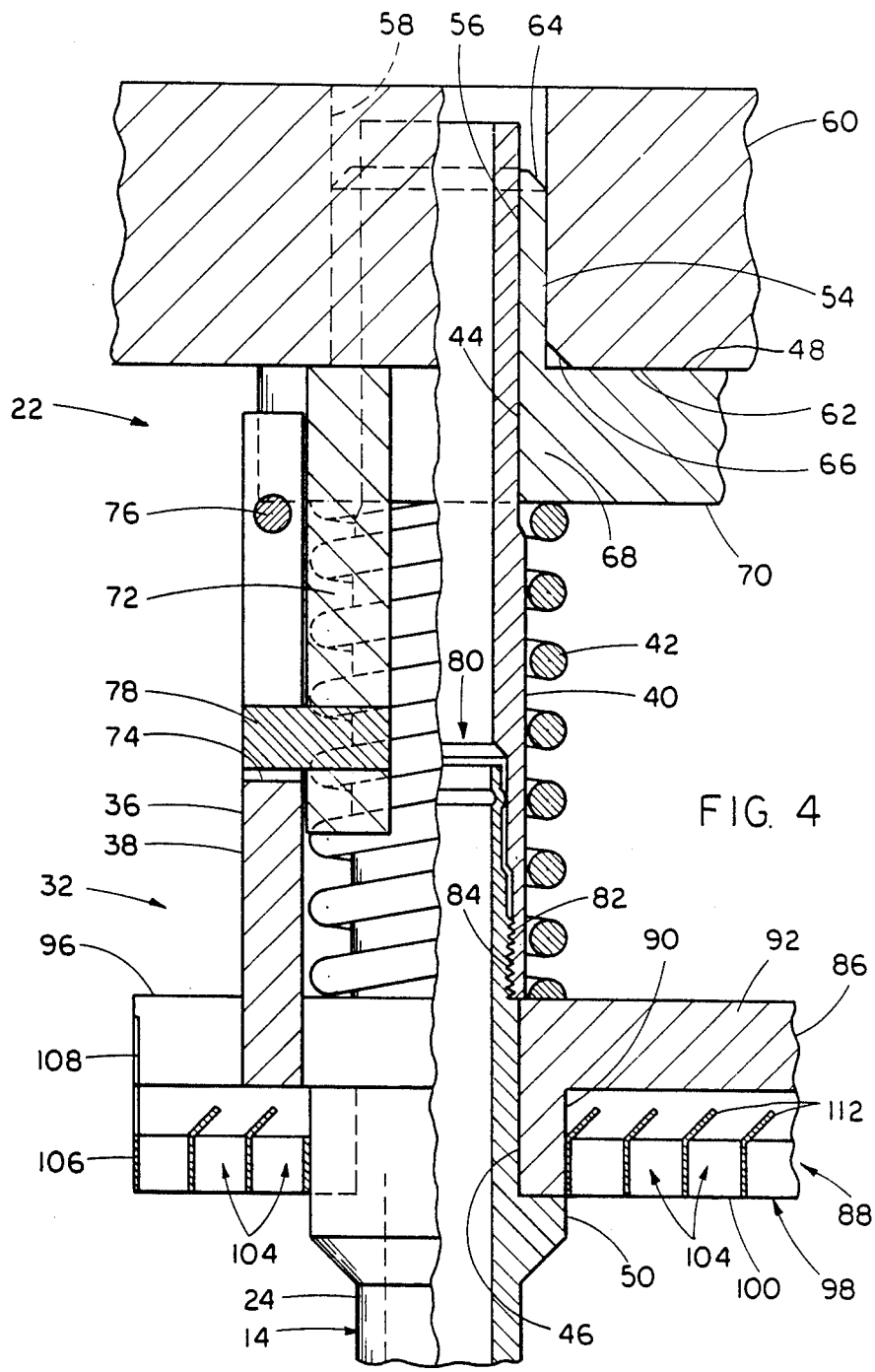
FIG. 4 is an enlarged fragmentary sectional view of the top nozzle and an upper end of one guide thimble of the fuel assembly as taken along line 4—4 of FIG. 2, showing the adapter plate and its fuel rod capture grid.
Figure 6:
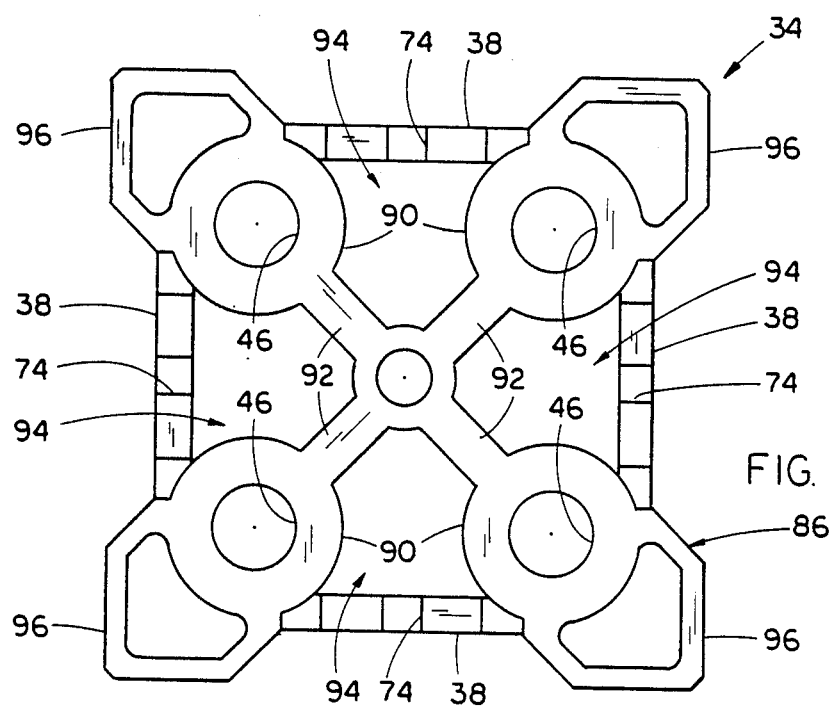
FIG. 6 is a top plan view of the lower adapter plate of the top nozzle of FIG. 2, showing the structural component of the adapter plate disassembled from the top nozzle.

Referring also to FIGS. 4 to 6, the top nozzle 22 also includes means interconnecting the spaced upper and lower plates 30,34 so as to accommodate movement of the lower plate 34 toward and away from the upper plate 30 upon axial movement of the guide thimbles 14 of the fuel assembly 10, such as due to thermal growth, toward and away from the upper core plate 60. Also, the interconnecting means is effective to limit movement of the lower adapter plate 34 away from the upper hold-down plate 30 so as to maintain the springs 42 in a state of compression therebetween. In particular, the interconnecting means includes a plurality of lugs 72 connected to and extending downwardly from peripheral ones of the ligaments 70. The lugs 72 are respectively coupled to the upstanding wall portions 38 of the discontinuous sidewall 36 of the enclosure 32. Specifically, a generally vertical slot 74 is formed in each wall portion 38 and opens at the upper end thereof. A removable locking pin 76 is inserted horizontally into the upper end of the wall portion 38 to close the upper end of the slot 74 and a pin 78 mounted in the lower end of each lug 72 extends into the slot 74 below the locking pin 76 for slidable movement therealong as the upper and lower plates 30,34 move relative to one another. In such arrangement, the locking pin 76 and the lower end of the slot 74 respectively define the limits of movement of the lower adapter plate 34 toward and away from the upper hold-down plate 30.

Referring now to FIG. 4, there is shown one of the elongated tubular alignment sleeves 40 extending through one of the hold-down coil springs 42 between the upper and lower plates 30,34 and the threaded features on the sleeve 40 and on the upper end portion 24 of the one guide thimble 14 for attaching the sleeve and guide thimble together. Also illustrated in the figure is the reusable locking arrangement, generally designated as 80, integrally associated with both the sleeve 40 and the guide thimble upper end portion 24 for locking the attached sleeve and guide thimble together. Since a description of the details of the reusable locking arrangement 80 is not necessary for understanding the adapter plate of the present invention, it will not be presented herein. Such arrangement comprises the invention disclosed and illustrated in the above cross-referenced patent application.

With respect to the threaded features on the guide thimble 14 and sleeve 40, the upper end portion 24 of the guide thimble 14 has an annular externally threaded section 82, whereas the tubular alignment sleeve 40 has a lower annular internally threaded section 84. The sleeve 40 is mounted through the passageway 44 and bore 56 of the hold-down plate hub 68 and boss 54 for rotatable and vertical axial movement relative to the guide thimble upper end portion 24 for threading and unthreading its internally threaded section 84 onto and from the externally threaded section 82 of the guide thimble upper end portion 24 in order to attach and detach the top nozzle 22 onto and from the guide thimble 14. The sleeve 40 is hollow so that, in addition to accommodating insertion of a control rod through it, a suitable tool (not shown) can be inserted into the sleeve for gripping it internally to rotate it in either direction for threading on and unthreading from the upper end portion 24 of the guide thimble 14. When threaded on the guide thimble upper end portion 24, the sleeve 40 cooperates with the lower retainer 50 to clamp the adapter plate 34 therebetween.

Adapter Plate with Fuel Rod Capture Grid having Pressure Drop Adjusting Feature Referring now to FIGS. 1 to 4 and 6 to 9, there is also shown the top nozzle adapter plate 34 of the present invention. The adapter plate 34 includes an upper structural component, generally designated 86, and a lower functional component, generally designated 88, being supported below and from the upper component 86.

As seen in FIG. 6, the upper structural component 86 of the adapter plate 34 includes spaced and interconnected hubs 90 and ligaments 92 arranged to define substantial open areas 94 for coolant flow therethrough. With such an open configuration, the component 86 has a very low pressure loss. At the same time, the upper structural component 86 provides a rigid framework capable of transmitting lifting loads imposed by the fuel assembly 10 from the wall portions 38 on the ligaments 92, through the ligaments and hubs 90, to the guide thimbles 14 which are connected to the hubs 90 and comprise the elongated structural members of the fuel assembly. The upper component 86 also includes a plurality of open corner flanges 96 connected to and extending outwardly of the hubs 90.

Referring specifically to FIGS. 2, 4 and 7 to 9, it is seen that the lower functional component 88 of the adapter plate 34 includes a grid, generally designated 98, composed of a plurality of spaced and interleaved straps 100 which extend in vertical planes generally parallel to the direction of coolant flow through the grid 98 and cross one another to form intersections 102 aligned with individual fuel rods 18 (a few of which are shown in dotted outline form in FIG. 2). Such alignment of the grid 98 with the fuel rods 18 restrains movement of the fuel rods upward from the fuel assembly 10 and thereby provides the fuel rod capture function of the adapter plate 34. The interleaved straps 100 of the grid 98 also define open channels 104 therethrough for allowing passage of coolant flow with very slight pressure drop.

Preferably, the grid 98 is positioned under the upper structural component 86 and has upstanding corner extensions or strips 106 for attachment to the corner flanges 96 of the adapter plate upper component. Specifically, the corner strips 106 fit into recesses 108 in the upper component corner flanges 96 where the strips are welded to the upper component 86. Further, as seen in FIG. 7, the grid 98 contains void areas 110 through which extend the hubs 90 of the upper component 86.

As seen in FIGS. 1, 2, 4 and 7 to 9, the lower functional component 88 of the adapter plate 34 also includes coolant flow directing means, in the form of a plurality of tabs 112, being operable to establish a predetermined desired pressure drop across the top nozzle 22 of the fuel assembly 10. The tabs 112 are connected to the upper edges of the grid straps 100 and extend upwardly therefrom. For the sake of clarity, the tabs are only shown on a portion of the grid straps in FIG. 7. It is to be understood that any arrangement of the tabs 112 is within the purview of the present invention, for instance, there can be a tab associated with each open channel 104 or only some of them.

The tabs 112 are bendable or adjustable into various desired positional relationships with respect to the open grid channels 104 for controlling coolant flow therethrough. By bending the tabs to extend at various predetermined angles across their respective channels, different pressure drops across different areas of the grid 98 and thus across the fuel assembly 10 can be established. Coolant flow can be biased to certain positions of the top nozzle. For example, if more flow is desired through the center of the nozzle and less around the areas where the hold-down springs 42 are located, the tabs of the grid can be bent to provide a higher pressure drop in the spring region than that is in the center. Since only the grid 98 is involved in these changes, the structural design of the upper component 86 of the adapter plate 34 remains unchanged. This ability to alter the pressure drop can be used advantageously in matching pressure drops of different fuel assemblies existing in a mixed vendor core.

In a modified form of the coolant flow directing means as seen in FIG. 10, a thin flat plate 114 having holes 116 of predetermined desired sizes and shapes formed therein, such as by punching, can be used instead of the tabs 112. The plate 114 is attached to the upper side of the grid 98 and extends along the interleaved straps 100 thereof with its holes 116 generally aligned with the open channels 104 of the grid 98. This design of the flow directing means provides structural strength and variability of flow area. While this design probably has less flexibility with the tabs 112, it may be more economical to manufacture.

While both the tabs 112 and plate 114 are illustrated as being positioned on the upper side of the grid 98, they could just as readily be positioned on the lower side thereof. Also, it should be understood that the upper side of the grid straps 100 can abut against the lower side of the ligaments 92 of the upper component 86 with the tabs 112 projecting upwardly into the open areas 94 of the component 86.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A top nozzle adapter plate for use in a fuel assembly of a nuclear reactor, said fuel assembly having a plurality of elongated structural members and a multiplicity of fuel rods disposed in a predetermined array, said fuel rods being supported in a manner which permits the possibility of upward movement thereof from said fuel assembly when acted upon by hydraulic forces occurring in upward coolant flow through said fuel assembly in said reactor, said adapter plate comprising:
   (a) an upper structural component capable of rigid connection to said elongated structural members; and
   (b) a lower functional component connected to said upper structural component and including a grid composed of a plurality of spaced and interleaved straps which extend in vertical planes generally parallel to the direction of coolant flow through the grid and cross one another to form intersections aligned with individual fuel rods in said array thereof, said strap intersections being capable of restraining movement of fuel rods upward from said fuel assembly while defining open channels through said grid which are capable of allowing passage of coolant flow therethrough, said lower component also including adjustable coolant flow directing means being operable to establish a predetermined desired pressure drop across said top nozzle of said fuel assembly.

2. The adapter plate as recited in claim 1, wherein said coolant flow directing means is in the form of a plurality of tabs connected to predetermined ones of said grid straps and extending outwardly therefrom, said tabs being adjustable into various desired positional relationships with respect to said grid channels for controlling coolant flow therethrough.

3. The adapter plate as recited in claim 1, wherein said coolant flow directing means is in the form of a thin flat plate having holes of predetermined desired sizes and shapes formed therein, said plate extending along said interleaved straps of said grid with its holes generally aligned with said open channels of said grid.

4. The adapter plate as recited in claim 1, wherein said upper structural component includes a plurality of spaced and interconnected hubs and ligaments arranged to define substantial open areas for coolant flow therethrough while providing a rigid framework capable of transmitting lifting loads imposed by said fuel assembly, said hubs being capable of connection to said elongated structural members of said fuel assembly.

5. The adapter plate as recited in claim 4, wherein said grid includes void areas through which said hubs of said upper component extend when said grid is connected to said upper component.

6. The adapter plate as recited in claim 4, wherein:
said upper component includes a plurality of open flanges connected to and extending outwardly of said hubs; and
said grid includes upstanding corner strips for attachment to said flanges of said upper component.

7. In a fuel assembly having a plurality of elongated members, top and bottom nozzles attached to upper and lower ends of said members, a multiplicity of fuel rods extending between said nozzles, a liquid coolant flow upwardly through said fuel assembly along said fuel rods thereof and support means for disposing said fuel rods in a generally side-by-side predetermined spaced relation to one another and to said elongated members, said support means permitting the possibility of upward movement of said fuel rods toward said top nozzle when acted upon by hydraulic forces, said top and bottom nozzles and elongated members together forming a rigid structural skeleton of said fuel assembly, an adapter plate in said top nozzle comprising:
(a) an upper structural component including a plurality of spaced and interconnected hubs and ligaments arranged to define substantial open areas for coolant flow therethrough while providing a rigid framework capable of transmitting lifting loads imposed by said fuel assembly, said hubs being connected to said elongated structural members of said fuel assembly; and
(b) a lower functional component connected to said upper structural component and including a grid composed of a plurality of spaced and interleaved straps which extend in vertical planes generally parallel to the direction of coolant flow through the grid and cross one another to form intersections aligned with individual fuel rods in said array thereof, said strap intersections being capable of restraining movement of fuel rods upward from said fuel assembly while defining open channels through said grid which are capable of allowing passage of coolant flow therethrough, said grid also including void areas through which said hubs of said upper component extend, said lower component also including adjustable coolant flow directing means being operable to establish a predetermined desired pressure drop across said top nozzle of said fuel assembly.

8. The adapter plate as recited in claim 7, wherein said coolant flow directing means is in the form of a plurality of tabs connected to predetermined ones of said grid straps and extending outwardly therefrom, said tabs being adjustable into various desired positional relationships with respect to said grid channels for controlling coolant flow therethrough.

9. The adapter plate as recited in claim 7, wherein said coolant flow directing means is in the form of a thin flat plate having holes of predetermined desired sizes and shapes formed therein, said plate extending along said interleaved straps of said grid with its holes generally aligned with said open channels of said grid.

10. The adapter plate as recited in claim 7, wherein:
said upper component includes a plurality of open flanges connected to and extending outwardly of said hubs; and
said grid includes upstanding corner strips attached to said flanges of said upper component.

11. A top nozzle adapter plate for use in a fuel assembly of a nuclear reactor, said fuel assembly having a plurality of elongated structural members and a multiplicity of fuel rods disposed in a predetermined array, said fuel rods being supported in a manner which permits the possibility of upward movement thereof from said fuel assembly when acted upon by hydraulic forces occurring in upward coolant flow through said fuel assembly in said reactor, said adapter plate comprising:
(a) an upper structural component capable of rigid connection to said elongated structural members; and
(b) a lower functional component connected to said upper structural component and including a grid composed of a plurality of spaced and interleaved straps which are capable of restraining movement of fuel rods upward from said fuel assembly while defining open channels through said grid which are capable of allowing passage of coolant flow therethrough, said lower component also including coolant flow directing means being operable to establish a predetermined desired pressure drop across said top nozzle of said fuel assembly;
(c) said coolant flow directing means being in the form of a plurality of tabs connected to predetermined ones of said grid straps and extending outwardly therefrom, said tabs being adjustable into various desired positional relationships with respect to said grid channels for controlling coolant flow therethrough.

12. The adapter plate as recited in claim 11, wherein said interleaved straps of said grid cross one another to form intersections capable of alignment with individual fuel rods in said array thereof.

13. The adapter plate as recited in claim 11, wherein said upper structural component includes a plurality of spaced and interconnected hubs and ligaments arranged to define substantial open areas for coolant flow therethrough while providing a rigid framework capable of transmitting lifting loads imposed by said fuel assembly, said hubs being capable of connection to said elongated structural members of said fuel assembly.

14. The adapter plate as recited in claim 13, wherein said grid includes void areas through which said hubs of said upper component extend when said grid is connected to said upper component.

15. The adapter plate as recited in claim 13, wherein:
said upper component includes a plurality of open flanges connected to and extending outwardly of said hubs; and
said grid includes upstanding corner strips for attachment to said flanges of said upper component.

16. In a fuel assembly having a plurality of elongated members, top and bottom nozzles attached to upper and lower ends of said members, a multiplicity of fuel rods extending between said nozzles, a liquid coolant flow upwardly through said fuel assembly along said fuel rods thereof and support means for disposing said fuel rods in a generally side-by-side predetermined spaced relation to one another and to said elongated members, said support means permitting the possibility of upward movement of said fuel rods toward said top nozzle when acted upon by hydraulic forces, said top and bottom nozzles and elongated members together forming a rigid structural skeleton of said fuel assembly, an adapter plate in said top nozzle comprising:

(a) an upper structural component including a plurality of spaced and interconnected hubs and ligaments arranged to define substantial open areas for coolant flow therethrough while providing a rigid framework capable of transmitting lifting loads imposed by said fuel assembly, said hubs being connected to said elongated structural members of said fuel assembly; and (b) a lower functional component connected to said upper structural component and including a grid composed of a plurality of spaced and interleaved straps which are capable of restraining movement of fuel rods upward from said fuel assembly while defining open channels through said grid which are capable of allowing passage of coolant flow therethrough, said grid also including void areas through which said hubs of said upper component extend, said lower component also including coolant flow directing means being operable to establish a predetermined desired pressure drop across said top nozzle of said fuel assembly;

(c) said coolant flow directing means being in the form of a plurality of tabs connected to predetermined ones of said grid straps and extending outwardly therefrom, said tabs being adjustable into various desired positional relationships with respect to said grid channels for controlling coolant flow therethrough.

17. The adapter plate as recited in claim 16, wherein said interleaved straps of said grid cross one another to form intersections aligned with individual fuel rods in said array thereof.

18. The adapter plate as recited in claim 17, wherein:
said upper component includes a plurality of open flanges connected to and extending outwardly of said hubs; and
said grid includes upstanding corner strips for attachment to said flanges of said upper component.

* * * * *